UNITED STATES PATENT OFFICE.

ADOLF CLEMM, OF MANNHEIM, GERMANY.

MANUFACTURE OF CHLORIN.

No. 819,410.         Specification of Letters Patent.         Patented May 1, 1906.

Application filed February 27, 1905. Serial No. 247,611.

*To all whom it may concern:*

Be it known that I, ADOLF CLEMM, a subject of the German Emperor, residing at Mannheim, Germany, have invented certain new and useful Improvements in the Manufacture of Chlorin, of which the following is a specification.

This invention has for its object the manufacture of chlorin and of a phosphate soluble in a solution of citric acid and is carried out in practice in the following manner.

Phosphate—as, for instance Florida-Algier phosphate—bones, or the like are treated with hydrochloric acid, and the solution of phosphate is separated from the residue and any excess of hydrochloric acid is neutralized until a precipitate begins to form at the surface. This solution of acid phosphoric acid salt and metal chlorid is subjected to electrolysis. Under the influence of the electric current chlorin is evolved at the anode, and at the cathode hydrogen is evolved and a precipitate of phosphate ($Ca_2H_2P_2O_8$) is formed. This precipitate of phosphate is completely and readily soluble in a two-per-cent. solution of citric acid. It is thus possible to obtain from the hydrochloric acid used chlorin as such and to convert the phosphate into a form in which it differs advantageously from the raw phosphate owing to its solubility in citric-acid solution, and by its purity its value above that of the raw phosphate is greatly enhanced.

It is obvious that the composition of the liquid to be electrolyzed may be different from that hereinbefore stated. For instance, this liquid may be obtained by mixing together a solution of acid calcium phosphate with chlorid of calcium, (or chlorid of magnesium or the like,) the electrolyzation of which gives the same result. The first mode of working is especially applicable where greater quantities of hydrochloric acid can be had at low cost and the second where chlorid of calcium or chlorid of magnesium can be obtained at low cost as by-products or waste and where a solution of acid calcium phosphate, such as that obtained in the extraction of low-grade phosphates by treating the latter with dilute sulfuric acid, can be produced more cheaply than by treating them with hydrochloric acid.

I claim—

The herein-described process of manufacturing chlorin and at the same time phosphate soluble in a solution of citric acid which consists in first preparing a combined solution of acid phosphoric acid salt, and a chlorid and then subjecting the said combined solution to the action of an electric current, as and for the purpose set forth.

In testimony whereof I have signed my name to this specification in the presence of two subscribing witnesses.

ADOLF CLEMM.

Witnesses:
H. W. HARRIS,
JOSEPH FEIST.